US012569747B1

(12) United States Patent
Weatherbee

(10) Patent No.: US 12,569,747 B1
(45) Date of Patent: Mar. 10, 2026

(54) SYSTEM FOR SETTING UP PITCHING DISTANCE

(71) Applicant: Randy Weatherbee, Cheney, WA (US)

(72) Inventor: Randy Weatherbee, Cheney, WA (US)

( * ) Notice: Subject to any disclaimer, the term of this patent is extended or adjusted under 35 U.S.C. 154(b) by 330 days.

(21) Appl. No.: 18/104,905

(22) Filed: Feb. 2, 2023

(51) Int. Cl.
A63C 19/08 (2006.01)
G01B 3/10 (2020.01)
G01B 3/1084 (2020.01)

(52) U.S. Cl.
CPC ............. *A63C 19/08* (2013.01); *G01B 3/1084* (2013.01)

(58) Field of Classification Search
CPC ....... A63C 19/06; A63C 19/065; A63C 19/08; G01B 3/1084
USPC .................... 33/1 G, 759; 473/497, 499, 500
See application file for complete search history.

(56) References Cited

U.S. PATENT DOCUMENTS

| | | | | | |
|---|---|---|---|---|---|
| 2,943,141 | A | * | 6/1960 | Knight | H04N 7/181 |
| | | | | | 348/E7.086 |
| 3,668,781 | A | | 6/1972 | Teter | |
| 4,160,324 | A | | 7/1979 | Dunn | |
| 4,267,637 | A | * | 5/1981 | Paull | G01C 15/12 |
| | | | | | 33/1 G |
| 4,845,858 | A | * | 7/1989 | Thomas | E04G 21/1891 |
| | | | | | 33/759 |
| 4,942,670 | A | * | 7/1990 | Brandt | E04G 21/1891 |
| | | | | | 33/759 |

| | | | | | |
|---|---|---|---|---|---|
| 5,371,949 | A | * | 12/1994 | Delaurier | A63C 19/065 |
| | | | | | 33/1 G |
| 5,928,095 | A | * | 7/1999 | Aldstadt | A63C 19/065 |
| | | | | | 33/759 |
| 6,141,880 | A | * | 11/2000 | Vircks | H01Q 11/14 |
| | | | | | 33/1 G |
| 6,578,274 | B1 | * | 6/2003 | Tango, Jr. | B44D 3/38 |
| | | | | | 33/1 G |
| 6,688,996 | B1 | * | 2/2004 | Mitani | A63B 69/0013 |
| | | | | | 473/500 |
| 6,893,365 | B2 | | 5/2005 | Rathbun et al. | |
| 7,371,194 | B2 | * | 5/2008 | Babiak | A63B 67/002 |
| | | | | | 473/468 |
| 7,476,165 | B2 | * | 1/2009 | Boesch | A63B 69/0013 |
| | | | | | 473/499 |
| 7,600,326 | B2 | * | 10/2009 | Plucknett | G01B 3/1084 |
| | | | | | 33/760 |
| 7,708,658 | B2 | * | 5/2010 | McInerney | A63B 69/36212 |
| | | | | | 33/756 |
| 8,356,418 | B1 | * | 1/2013 | Hall | G01B 3/1056 |
| | | | | | 33/701 |
| 2002/0088134 | A1 | * | 7/2002 | Watts | G01B 3/1071 |
| | | | | | 33/759 |
| 2004/0005942 | A1 | * | 1/2004 | Wang | A63B 69/0013 |
| | | | | | 473/500 |
| 2006/0010705 | A1 | | 1/2006 | Dettellis | |
| 2009/0217542 | A1 | * | 9/2009 | Watkins | B65D 83/386 |
| | | | | | 33/775 |

* cited by examiner

*Primary Examiner* — George B Bennett
(74) *Attorney, Agent, or Firm* — Lee & Hayes, P.C.

(57) ABSTRACT

A system includes a rectangular shaped body, an irregular pentagon shaped body, and a spool. The spool includes a cord having a first end coupled to the spool, a second end configured to unwind at least partially from the spool, and an indicium marked at a position along a length of the cord associated with a pitching distance disposed between the rectangular shaped body and the irregular pentagon shaped body.

20 Claims, 16 Drawing Sheets

102

214

108

210

208

212

204

106

200

110

104

212

210

108

208

206

214

204

106

202

110

104

700

112

704

702

104

704

112

702

108

802

804

806

808

800

104

112

108

900

804

114

102

110

104

112

108

806

114

902

102

110

104

112

108

808

114

904

102

110

1000

1002

106

Z ← X 1100
1106
1112
1104
1118
1120
1114
1116
1108
1110

Z
X

1200

1202    204    1206    208

1208

1204

SYSTEM FOR SETTING UP PITCHING DISTANCE

BACKGROUND

Baseball is conventionally played on a baseball field having a baseball diamond, pitching mound, fences, foul lines, and so forth. In some instances, however, baseball may be played within other environments, such as indoor practice facilities, gymnasiums, or open fields that do not have dedicated elements of a baseball field. In these instances, a portable pitching mound, bases, foul lines, and the like may be used. Ensuring that the pitching mound and home plate, for example, are properly spaced apart from one another may be a tedious process. Additionally, the distance between elements of the baseball field, such as home plate and the pitching mound, may be different at the Major League Baseball, college, high school, and little league levels.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The devices and systems depicted in the accompanying figures are not to scale and components within the figures may be depicted not to scale with each other.

DETAILED DESCRIPTION

Figure 1:
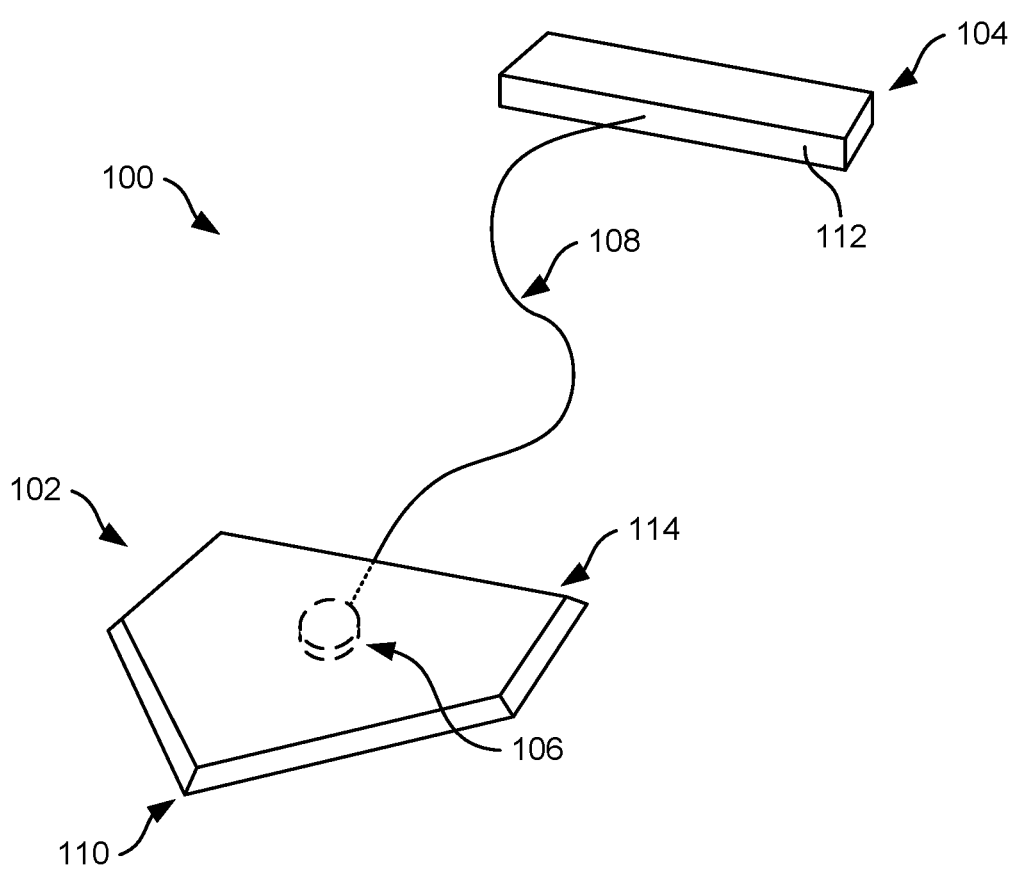
FIG. 1 illustrates a perspective view of an example system including a portable base, a spool disposed within the base, and a portable plate, according to an example of the present disclosure.
Figure 1:
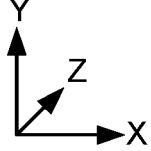

This application is directed, at least in part, to a system for spacing a plate (e.g., body, frame, etc.) at certain distance(s) away from a base (e.g., body, frame, etc.). In an embodiment, the plate may represent a pitching plate on which a pitcher stands and pushes off during pitching, while the base may represent a home base (alternatively, home plate) that defines a strike zone for a batter and a base that a player must touch to score a run. The plate and/or the base may be portable such that the plate and the base may be set up in a field, gymnasium, or other environment that does not have a dedicated baseball field. In an embodiment, the plate or the base may include a cord wound about a spool, and the cord may be pulled from the spool by certain distance(s) in order to properly space the plate and the base apart from one another. In an embodiment, the cord may include indicia that visually indicate when the plate and the base are spaced apart by certain distances. Accordingly, the plate and the base may be conveniently set up for practice, games, and/or pitching exercises.

In an embodiment, the plate and/or the base may be formed from rubber. The plate may be substantially rectangular shaped, while the base may be an irregular pentagon shape. Depending upon the level or baseball (e.g., league), the plate and the base may be spaced apart from one another by a certain distance. For example, in little league, the pitching distance is forty-six feet (46'), whereas in high school, college, and Major League Baseball, the pitching distance is sixty feet and six inches (60' 6"). Pony baseball (13 and 14 year old's) have a pitching distance of fifty feet (50'). The pitching distance may be measured from a back point of home base to the front edge of the pitcher plate.

The cord is configured to be unwound from the spool for spacing the plate and the base at various distances from one another. In an embodiment, the spool may be coupled to, or disposed in, the base; and the cord may be routed through a channel within the base to a perimeter of the base. For example, an end of the cord may be disposed along a leading edge of the base that faces the plate. During set up, the end of the cord may be pulled such that cord unwinds from the spool. When the cord is unwound by a certain distance corresponding to a desired pitching distance between the plate and the base, the plate may be placed at the end of the cord, thereby accurately spacing the plate apart from the base.

In an embodiment, the cord includes the various indicia to visual indicate or otherwise signify when the plate and the base are spaced apart by the appropriate pitching distance. In an embodiment, the indicia may include numbers, colored sections, markers, and the like. Along the length of the cord, the indicia may be scribed, taped, impression, painted, or otherwise marked. For example, a first indicium may be placed at a first location from the end of the cord, a second indicium may be placed at second location from the end of the cord, and a third indicium may be placed at a third location from the end of the cord. In an embodiment, the first location may correspond to the pitching distance for little league, the second location may correspond to the pitching distance for Pony baseball, and the third location may correspond to the pitching distance for Major League Baseball. As the cord is advanced out of the plate and unwound from the spool, when the appropriate indicium is visible on the cord (e.g., external to the channel of the base), a user may place the plate at the end of the cord. That is, as the cord is unwound from the spool and pulled external to the base, the indicia become visible for spacing the base and the plate apart by a desired distance.

The location of the indicia on the cord may take into consideration a dimension of the base and/or a location of the spool within the base. For example, given that the spool may be disposed within the base, the actual length of the cord between the leading edge of the base and the front edge of the plate may not be equal to the pitching distance. Noted above, the pitching distance is measured between the front edge of the plate and the back point the base. The base may have a depth (from the leading edge to the back point) of seventeen inches (17"). The cord may be unwound from the spool at a distance spaced apart from the leading edge of the base by a distance of, for example, six inches (6"). In this example, for the pitching distance for little league, the first indicium may be marked at forty-five feet and one inch (45' 1") from the end of the cord. Accordingly, when the first indicium is visible, the leading edge of the base may be spaced apart from the front edge of the plate by forty-four feet and seven inches (44' 7"). Given the depth of the base, the pitching distance may be forty six feet (e.g., 44'7"+ 17"=46'). However, although the spool is described as being at a certain distance spaced apart from the leading edge of the base, the spool may be located at other distances from the leading edge. For example, the indicia may be marked at the pitching distance less seventeen inches, to take into consideration the depth of the base. Regardless, the indicia on the cord may be marked appropriately on the cord and factor in the dimension of the base and/or the placement of the spool within the base.

In an embodiment, the end of the cord may include a first attachment mechanism that engages with a second attachment mechanism of the plate. For example, the first attachment mechanism may represent a hook, magnet, hook and loop, button, fastener, and the like. The second attachment mechanism may represent a hook, magnet, hook and loop, fastener, receptacle, and the like that receives or otherwise engages with the first attachment mechanism. Initially, before setting up the plate and the base, the first attachment mechanism and the second attachment mechanism may be engaged. As the user moves the plate away from the base, the engagement between the first attachment mechanism and the second attachment mechanism may unwind the cord from the spool. This may avoid requiring the user having to grasp the cord during set up. Instead, given the coupling between the first attachment mechanism and the second attachment mechanism, the cord may be unwound from the spool as the user moves the plate away from the base, vice versa.

In an embodiment, the base may define a cavity within which the spool resides. For example, the base may include a top surface corresponding to a top of the base, and a bottom surface corresponding to a bottom of the base. The bottom may rest against a ground surface (e.g., grass, floor, etc.) during use. In an embodiment, the cavity is formed within the bottom surface of the base, and the spool may reside within the cavity. In an embodiment, the spool may rotate about a pin, post, etc. as the cord unwinds and winds about the spool. Additionally, the channel may be disposed between the cavity and the leading edge of the base, where the cord may route from the spool to the leading edge of the base through the channel.

In an embodiment, the first attachment mechanism disposed on the end of the cord may prevent the cord being completely wound onto the spool. For example, in an embodiment, the first attachment mechanism may be disposed adjacent to the leading edge of the base, or within a pocket at the leading edge. The first attachment mechanism may permit the user to easily grasp the first attachment mechanism (or the end of the cord) for spacing the plate and the base apart by the pitching distance. For example, without the first attachment mechanism, the cord may be recoiled completely onto the spool, thereby making set up less convenient. However, rather than including the first attachment mechanism, a stopper, plug, handle or other mechanism may be disposed on the end of the cord to prevent the cord from going all the way into the channel and/or the cavity once the cord is recoiled as well as to permit the cord to be grasped by the user.

In an embodiment, the spool may include a coil spring that automatically retracts the cord when released. For example, after the user has pulled the plate to the appropriate pitching distance, the user may release the cord, uncouple the first attachment mechanism and the second attachment mechanism, etc. and place the plate on the ground. The coil spring may retract the cord and coil the cord around the spool. Alternatively, the spool may include a handle that is rotatable to retract the cord. For example, once disposed at the proper pitching distance, the handle may be rotated to retract the cord and wind the cord about the spool. In other examples, a clamp may be used to pitch, clasp, or otherwise hold the cord to prevent recoiling on the cord until the base and the plate are separated by the desired distance.

In an embodiment, before separating the plate and the base (i.e., walking the plate away from the base), the user may unwind a desired length of cord from the spool. For example, the user may pull a certain length of the cord out corresponding to the appropriate pitching distance desired. Therein, the user may walk the cord and the plate to the appropriate location.

In an embodiment, rather than the spool being coupled to, or disposed in, the base, the spool may be coupled to, or disposed in, the plate. Similar to that described above, the user may space the plate apart from the base, and the cord may be unwound from the spool within the plate. In an embodiment, the cord may attach or otherwise couple to the base (e.g., at the leading edge or at the back point) to provide resistance as the plate is spaced apart from the base and the cord is unwound. Hereto, once placed at the appropriate pitching distance, the cord may be wound about the spool in the plate.

In an embodiment, the base may include additional spools that are used to place additional bases on a baseball field. For example, in addition to the spool that spaces the plate apart from the base, the base may additionally or alternatively include a second spool and/or a third spool. The second spool may include a cord that unwinds from a first side of the base, while the third spool may include a cord that unwinds from a second side of the base, opposite the first side. Similar to that described, an additional base, such as first base, may be spaced apart from the first side of the base by a certain distance, such as sixty feet (60') in little league, eighty feet (80') in Pony baseball, ninety feet (90') in Major League Baseball. The cord may include indicia that indicate when the additional base is spaced apart from the base by the proper distance. Similarly, another base, such as third based may be spaced apart from the second side of the base by a certain distance and may include indicia that indicate when the additional base is spaced apart by the proper distance.

In an embodiment, rather than including multiple indicia on the same cord, different spools and/or cords may be used depending upon the level of baseball. For example, a first cord and/or first spool may be used in conjunction with a plate and a base used for little league, a second cord and/or second spool may be used in conjunction with a plate and a base used for college, and so forth. Here, the cords may include an appropriate length corresponding to the level of baseball and may be fully unwound to the appropriate pitching distance. That is, when the cord is fully unwound from the spool, the base and the plate may be spaced apart by the pitching distance. In an embodiment, the spools with the different length of cords may be interchangeable on/within the base depending upon the desired pitching distance. In such instances, given that the cords are fully unwound to the desired pitching distance, the cords may not have the indicia.

In an embodiment, the spool may have predetermined stops as the cord is unwound. For example, when the cord is unwound by a first distance corresponding to a first pitching distance (e.g., little league), the spool may stop unwinding (e.g., lock). However, if another pitching distance is desired, the user may apply a sufficient amount of force (e.g., increased pull, tug, jerk, etc.) necessarily to overcome the stop. Therein, the user may continue to unwind the cord from the spool until the cord is unwound by a second distance corresponding to a second pitching distance (e.g., Pony). However, if another pitching distance is desired, the user may again apply a sufficient amount of force (e.g., increased pull, tug, jerk, etc.) necessarily to overcome the stop. Therein, the user may continue to unwind the cord from the spool until the cord is unwound by a third distance corresponding to a third pitching distance (e.g., college).

In an embodiment, the plate and/or the base may include computing components that output notifications when the plate and/or the base are appropriately spaced apart. For example, the plate and/or the base may include sensor(s) that measure a distance between the plate and the base, respectively. The sensor(s), for example, may include LiDAR sensor(s), RADAR sensor(s), Sonar sensor(s) (i.e., ultrasonic sensor(s)), imaging sensor(s), infrared (IR) sensor(s), and so forth. In an embodiment, the sensor(s) may be arranged to image marker(s) disposed on the plate or the base, respectively, for determining a distance between the plate and the base. Additionally, the base or the plate may include various input/output (I/O) components for setting the distance between the base and the plate, as well as providing notifications when the base and the plate are appropriately spaced apart. For example, buttons, a touch screen, or other input device may be used to programmatically set the appropriate distance between the base and the plate. Thereafter, as the base and the plate are separated, output components, such as a speaker, lighting element (e.g., light emitting diode (LED)), display screen, and the like may output a notification when the base and the plate are spaced apart by the appropriate distance. In response to the notification, the user may place the base or the plate at the appropriate location.

In an embodiment, given that the plate and/or the base may be stepped on during use, support members (e.g., plates, bars, struts, etc.) may be molded, embedded, or otherwise attached to the plate and/or the base to provide support for the spool and/or prevent damage thereto, respectively. In an embodiment, the spool may be disposed within a cover, shield, plate, etc. on the plate or the base to prevent dirt or other debris negatively impacting its functionality.

Although the discussion herein relates to spacing a plate and a base apart from one another by appropriate distances, the systems, devices, and methods described herein may be implemented within other environments or applications. For example, the system may find use in setting up a softball field, spacing apart cones used in soccer, spacing apart a teeing mat and a golf hole, and so forth. Additionally, although various pitching distances are described, and/or various lengths of the pitching distances are described, the cord may be unwound to other pitching distances, a greater number of pitching distances (with appropriate indicia), and so forth. In an embodiment, a surface of the plate and/or the base in contact with the ground on which the plate and the base are engaged (e.g., floor, grass, etc.) may include gripping elements to prevent the plate and the base reorienting during use. For example, the plate and/or the base may include spikes, rubber pads, pegs, and the like for gripping against the ground.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example system 100, which in an embodiment, includes a base 102 (e.g., member, body, etc.), a plate 104 (e.g., member, body, etc.), a spool 106, and a cord 108 configured to be disposed between the base 102 and the plate 104 for spacing the base 102 and the plate 104 apart by appropriate distances. In an embodiment, the base 102 corresponds to a home base of a baseball field (alternatively referred to as a "home plate") and the plate 104 corresponds to a pitching mound (alternatively referred to as a "pitching plate") The system 100 may be portable such that the base 102 and the plate 104 may be set up within fields, gymnasiums, or other environments in which baseball is to be played or practiced.

The spool 106, as shown, may be disposed within the base 102 and the cord 108 is configured to unwind from and wind onto the spool 106. As will be explained herein, the cord 108 is used to space the base 102 and the plate 104 apart from one another by certain distances. For example, in baseball, the base 102 and the plate 104 are spaced apart by a pitching distance. The pitching distance is often measured between a back point 110 of the base 102 and a front edge 112 of the plate 104. In little league, the pitching distance is forty-six feet (46'), whereas in high school, college, and Major League Baseball, the pitching distance is sixty feet and six inches (60' 6"). Pony baseball (13 and 14 year old) have a pitching distance of fifty feet (50'). The cord 108 may be used to space the base 102 and the plate 104 apart by an appropriate distance corresponding to the desired pitching distance. As such, within an empty field, gymnasium, or other environment that does not include dedicated elements of a baseball field, the cord 108 may be used to appropriately space the base 102 and the plate 104 apart from one another.

The cord 108 represents any suitable line, cable, rope, etc. that is capable of being wound on and unwound from the spool 106. As will also be explained herein, the cord 108 may include indicia that indicate when the base 102 and the plate 104 are spaced apart by an appropriate pitching distance. Different indicia may be included on the cord 108 such that the system 100 may be usable across different levels of baseball. For example, the cord 108 may include a first indicium at a first location on the cord 108 that corresponds to the pitching distance for little league, a second indicium at a second location on the cord 108 that corresponds to the pitching distance for college, and so forth.

In addition to including the back point 110, the base 102 includes a leading edge 114 that is oriented towards the front edge 112 of the plate 104. In an embodiment, the cord 108 is disposed through the leading edge 114 of the plate 104. For example, during set up, a user may grasp the cord 108 and pull the cord 108 as the user walks away from the base 102. In doing so, the cord 108 unwinds from the spool 106. Upon reaching the desired pitching distance, such as indicated by the indicia on the cord 108, the user may place the plate 104 at an end of the cord 108 and on the ground. Therein, the cord 108 may be wound back onto the spool 106, whether via a ratchet, automatic recoil (e.g., coil spring), handle, or other mechanism. The base 102 may include a sufficient weight to resist being pulled as the cord 108 is unwound from the spool 106.

In an embodiment, the cord 108 may temporarily couple to the base 102, such as the front edge 112, during set up such that the user may not have to grasp the cord 108. In such instances, for example, the user may temporarily couple the cord 108 to the plate 104, and then move the plate 104 to the appropriate location. The coupling between the plate 104 and the cord 108 may unwind the cord 108 from the spool 106. Such coupling may include magnets, hook and loop, fasteners, hooks, buttons, and so forth.

Figure 2A:
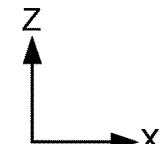
FIG. 2A illustrates a first side view of the portable base and the spool of FIG. 1, according to an example of the present disclosure.
Figure 2B:
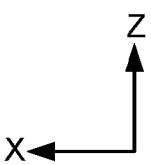
FIG. 2B illustrates a second side view of the portable base and the spool of FIG. 1, according to an example of the present disclosure.

FIGS. 2A and 2B illustrate a first side view and a second side view of the base 102 with the spool 106. In an embodiment, FIG. 2A illustrates a top 200 of the base 102 and FIG. 2B illustrates a bottom 202 of the base 102. The top 200 may be oriented away from a surface (e.g., grass, floor, turf, etc.) upon which the base 102 is placed, and the bottom 202 may be oriented towards the surface upon which base is placed. The spool 106 and the cord 108, in FIG. 2A are shown in dashed lines to indicate their position within (e.g., beneath) the base 102.

In an embodiment, the base 102 defines a cavity 204 within which the spool 106 is disposed. For example, the cavity 204 may be disposed in, or defined by, a bottom surface 206 of the base 102. The spool 106 is configured to rotate within the cavity 204 during a winding and unwind of the cord 108. As shown, the cavity 204 may be circular in shape.

The cavity 204 may also connect to a channel 208. The channel 208 may extend between the cavity 204 and the leading edge 114 of the base 102 for directing the cord 108 out the leading edge 114. As such, when the user sets up the base 102 and the plate 104, the cord 108 may be easily grasped by the user (e.g., external to the channel 208 at the leading edge 114). In an embodiment, a handle 210 may be disposed at an end of the cord 108 for being grasped by the user. The handle 210 may also prevent the cord 108 completely retracting within the channel 208 and winding about the spool 106. For example, the handle 210 may be sized greater than the channel 208 to prevent the cord 108 being recoiled completely onto the spool 106. In an embodiment, the channel 208 may be disposed in, or defined by, the bottom surface 206 of the plate 104. Alternatively, the channel 208 may be formed through the base 102, at a location between the top 200 and the bottom 202.

Although the spool 106 is shown at a particular location within the base 102, the spool 106 may be located differently than shown. For example, the spool 106 may be located closer to the leading edge 114 than shown, may be located closer to the back point 110 than shown, and so forth. Additionally, in an embodiment, the spool 106, the cavity 204, and/or the channel 208 may be sized differently than shown. In an embodiment, the spool 106 may be located centrally between a first side 212 and a second side 214 of the base 102. Additionally, the cavity 204 and the channel 208 may similarly be located centrally between the first side 212 and the second side 214.

Figures 3, 4:
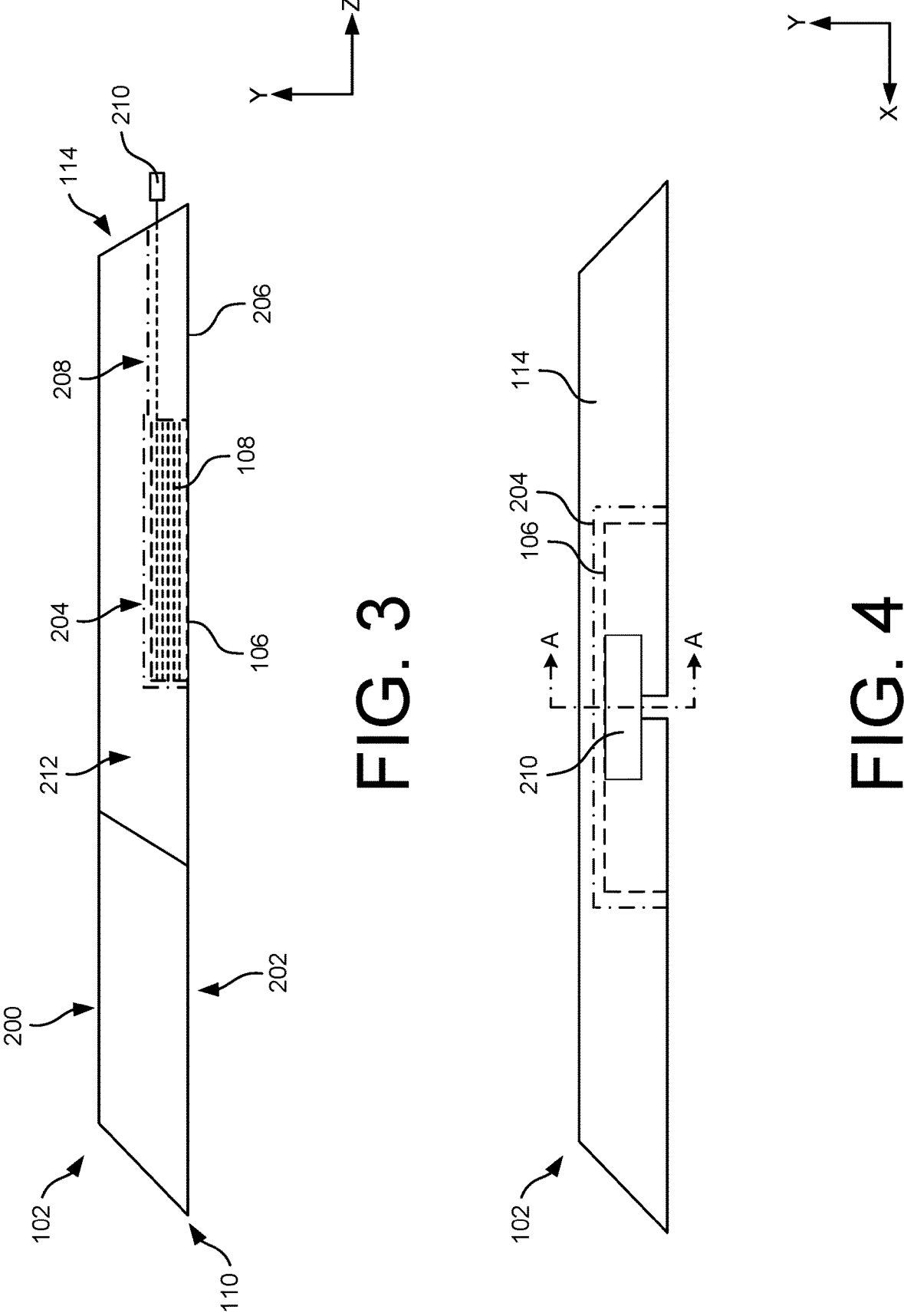
FIG. 3 illustrates a third side view of the portable base and the spool of FIG. 1, according to an example of the present disclosure.
FIG. 4 illustrates a fourth side view of the portable base and the spool of FIG. 1, according to an example of the present disclosure.

FIG. 3 illustrates a third side view of the base 102 with the spool 106. In an embodiment, FIG. 3 illustrates a view of the first side 212 of the base 102. The spool 106 and the cord 108 are shown being located within the base 102, as indicated by their respective dashed lines. For example, the spool 106 may be disposed between the top 200 and the bottom 202 of the base 102. The base 102 includes a height, between the top 200 and the bottom 202 (e.g., in the Y-direction), that is greater than a height of the spool 106.

The cavity 204 and the channel 208 are formed within the base 102 for receiving the spool 106 and for routing the cord 108 from the spool 106 to a location external to the base 102, respectively. For example, the handle 210 coupled to an end of the cord 108 may be disposed adjacent to the leading edge 114. An opposite end of the cord 108 is wound about the spool 106. Although the cavity 204 and the channel 208 are shown disposed in the bottom surface 206 of the base 102, the cavity 204 and/or the channel 208 may be disposed in a top surface of the base 102 or through a middle of the base 102, for example.

FIG. 4 illustrates a fourth side view of the base 102 with the spool 106. In an embodiment, FIG. 4 illustrates a view of the leading edge 114 of the base 102 (e.g., a front of base 102).

The channel 208 is formed within the base 102 for routing the cord 108 from a location internal to the base 102 to a location external to the base 102. The handle 210 may be disposed on the end of the cord 108, external to the channel 208. As shown, and in an embodiment, the handle 210 may be sized larger than the channel 208 (e.g., height, width, etc.) to dispose the handle 210 adjacent to the leading edge 114 and prevent the cord 108 completely recoiling onto the spool 106. Although a certain size and/or shape of the handle 210 is shown, alternate shapes and/or sizes are envisioned.

Figure 5:
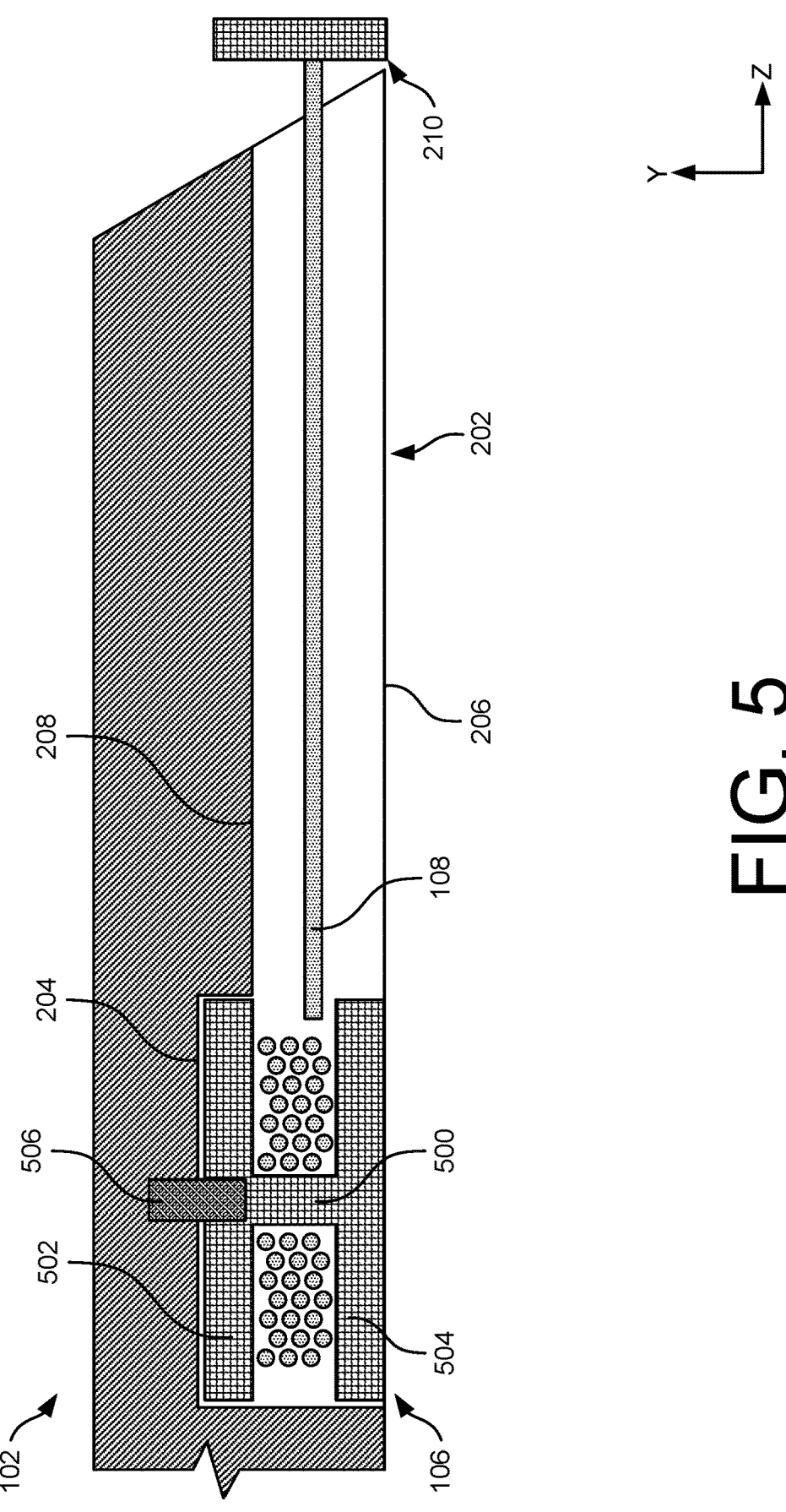
FIG. 5 illustrates a cross-sectional view of the portable base and the spool of FIG. 1, taken along line A-A of FIG. 4, according to an example of the present disclosure.

FIG. 5 illustrates a cross-sectional view of the base 102 with the spool 106, taken along line A-A of FIG. 4. The base 102 defines the cavity 204 that receives the spool 106 having the cord 108 wound thereabout. In an embodiment, the cord 108 winds and unwinds about a column 500 of the spool 106, between a first flange 502 and a second flange 504 of the spool 106. The column 500 is disposed between the first flange 502 and the second flange 504.

In an embodiment, the spool 106 may rotate about a post 506 formed within or coupled to the base 102. For example, the post 506 may extend into the cavity 204 for rotatably coupling to the spool 106. As the cord 108 is unwound from and wound onto the spool 106, the spool 106 may rotate about the post 506 (e.g., Y-axis) within the cavity 204. The spool 106 may be removably coupled to the post 506 (e.g., compression fit, snap fit, etc.) or permanently affixed to the post 506.

Additionally, the cord 108 routes through the channel 208, from the cavity 204, to the leading edge 114 of the base 102.

Although the channel 208 is shown being formed within the bottom surface 206 of the base 102, the channel 208 may be disposed within or through the base 102, at a location between the top and the bottom 202. In such instances, the channel 208 may not extend from the bottom surface 206 of the base 102.

Although not shown, a cover may be placed over the cavity 204 and/or the channel 208. The cover, for example, may secure the spool 106 within the base 102, such as within the cavity 204, and/or prevent dirt (or other debris) entering the cavity 204 and effecting a functionality of the spool 106.

Figure 6A:
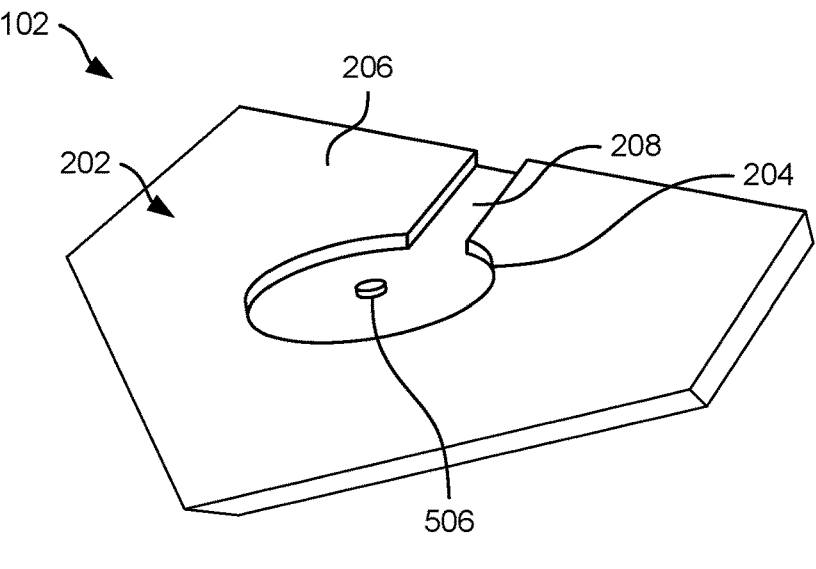
FIG. 6A illustrates a perspective view of the portable base of FIG. 1, according to an example of the present disclosure.
Figure 6B:
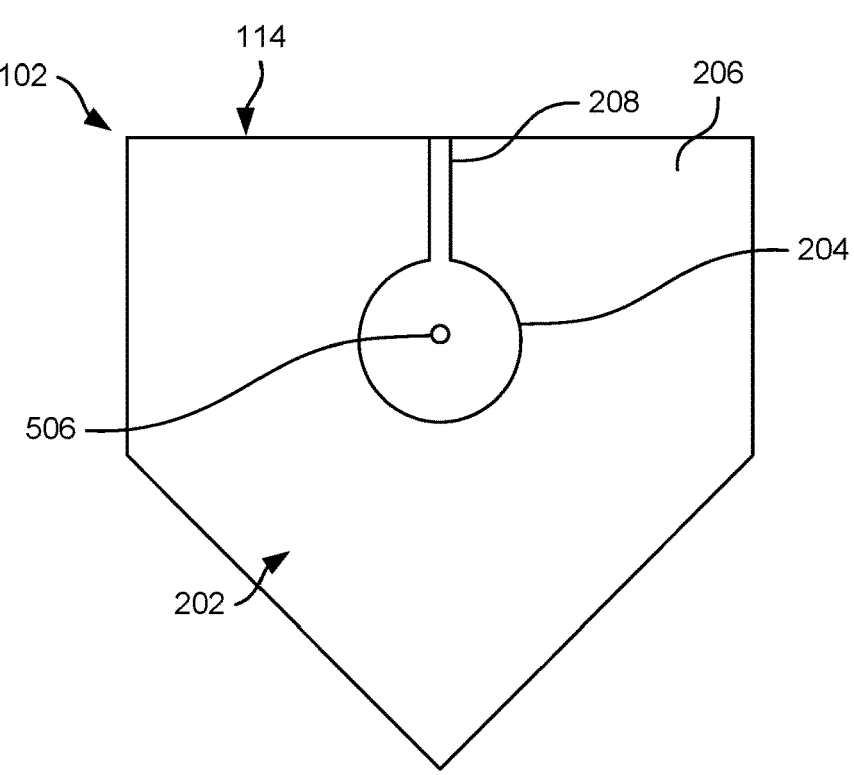
FIG. 6B illustrates a side view of the portable base of FIG. 1, according to an example of the present disclosure.
Figure 6B:
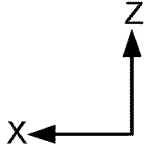

FIGS. 6A and 6B illustrate the base 102, showing the spool 106 uncoupled from the base 102. The views shown in FIGS. 6A and 6B illustrate the second side that may correspond to the bottom 202 of the base 102. As shown, the cavity 204 and the channel 208 may be formed within the bottom surface 206 of the base 102. The channel 208 extends from the cavity 204 to the leading edge 114 of the base 102. Additionally, the post 506 is disposed within the cavity 204 for receiving the spool 106.

Figure 7A:
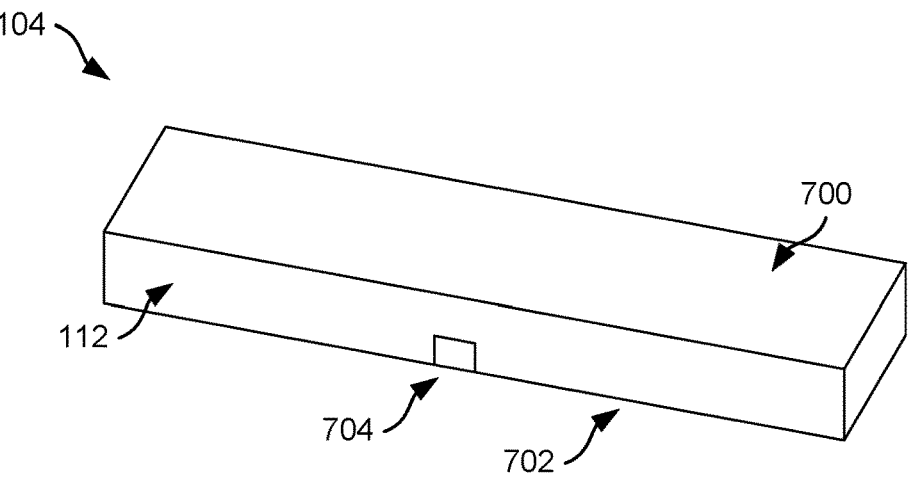
FIG. 7A illustrates a perspective view of the portable plate of FIG. 1, according to an example of the present disclosure.
Figure 7A:
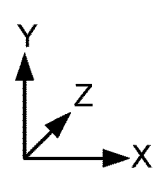
Figure 7B:
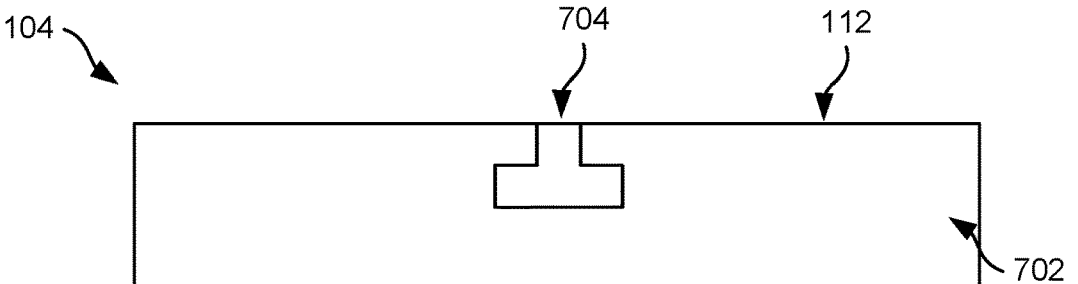
FIG. 7B illustrates a side view of the portable plate of FIG. 1, according to an example of the present disclosure.
Figure 7B:
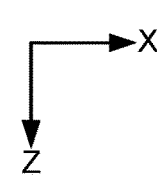

FIGS. 7A and 7B illustrate the plate 104, which includes the front edge 112 that faces the base 102. The plate 104 may also include a top surface 700 and a bottom surface 702 opposite the top surface 700. During use, a pitcher, for example, may stand on the top surface 700 and/or press against the front edge 112 and/or the top surface 700 during a pitching motion. The bottom surface 702 may be disposed against a surface (e.g., floor, grass, etc.) on which the plate 104 rests.

In an embodiment, the plate 104 may include a receptacle 704 that receives the handle 210 or a portion of the cord 108. For example, the handle 210 may fit within the receptacle 704 to couple to the plate 104, and thereafter, the plate 104 may be spaced apart from the base 102. In an embodiment, the handle 210 may be temporarily coupled to the plate 104, within the receptacle 704, when the plate 104 is being spaced apart from the base 102. This may, for example, allow a user setting up the base 102 and the plate 104 to pull on the plate 104, with the handle 210 engaged within the receptacle 704, to unwind the cord 108 from the spool 106.

In an embodiment, the engagement between the handle 210 and the receptacle 704 may represent an attachment mechanism that secures the cord 108 to the plate 104. However, in an embodiment, the cord 108 may include other attachment mechanisms that engage with attachment mechanisms of the plate 104. For example, rather than including the handle 210, the end of the cord 108 may include a first attachment mechanism that engages with a second attachment mechanism of the plate 104. For example, the first attachment mechanism may represent a hook, magnet, hook and loop, button, fastener, and the like. The second attachment mechanism may represent a hook, magnetic, hook and loop, fastener, receptacle, and the like that receives or otherwise engages with the first attachment mechanism.

Figure 8:
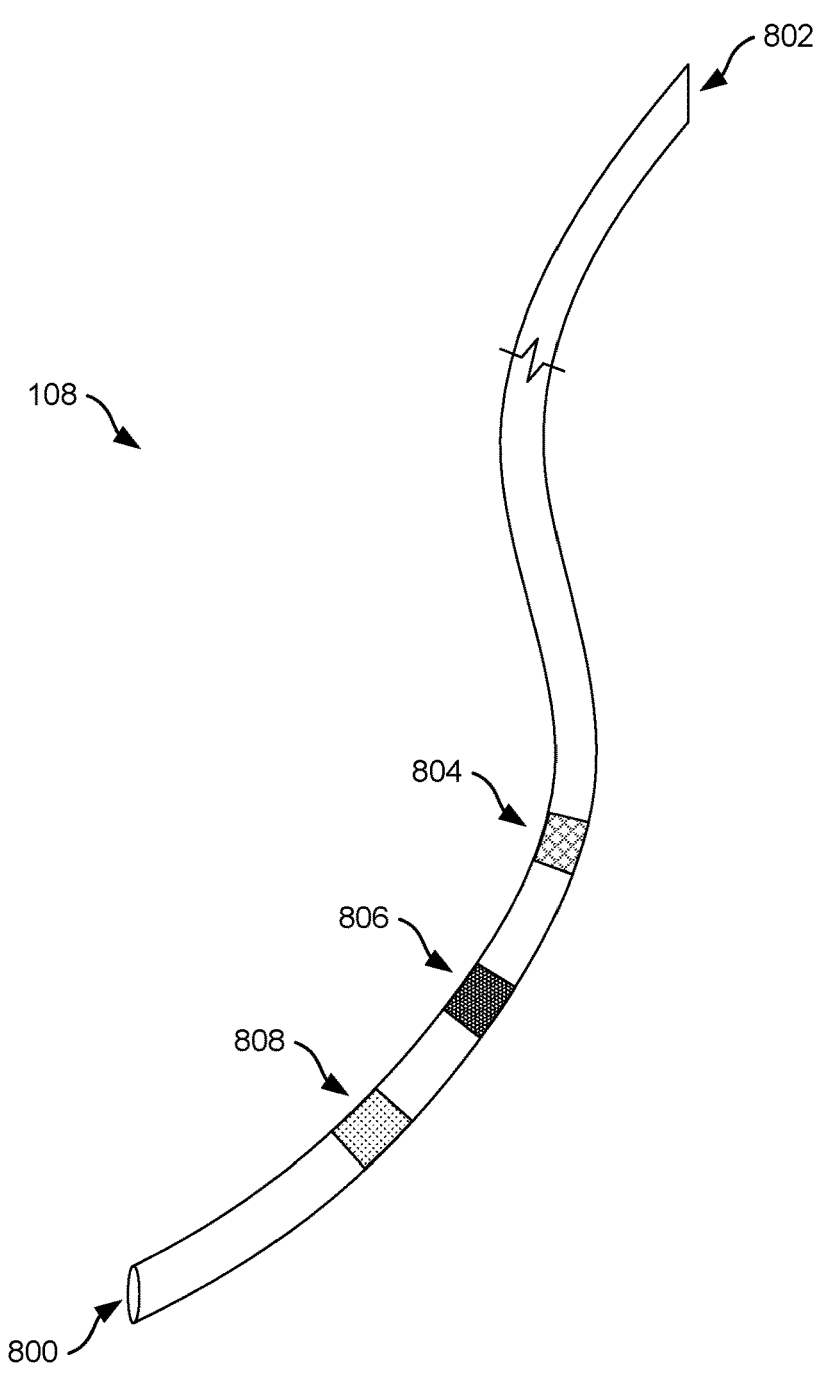
FIG. 8 illustrates an example cord wound around the spool of FIG. 1 for spacing the portable base and the portable plate at certain distances apart from one another, according to an example of the present disclosure.
Figure 8:
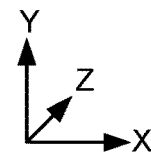

FIG. 8 illustrates the cord 108 decoupled from the spool 106. The cord 108 includes a length that extends between a first end 800 of the cord 108 and a second end 802 of the cord 108. The first end 800 may couple to the spool 106, and the second end 802 may couple to the handle 210. The cord 108 may include any suitable material that is capable of being wound and unwound from the spool 106. Example materials include wire, rope (e.g., nylon, linen, cotton, etc.), plastic, fibers, and so forth. Additionally, the cord 108 may include any appropriate thickness.

The cord 108 may include different indicia disposed along the length of the cord 108. For example, the cord 108 may include a first indicium 804, a second indicium 806, and a third indicium 808. In an embodiment, the first indicium 804, the second indicium 806, and the third indicium 808 may be spaced apart at different lengths from the second end 802 of the cord 108. The first indicium 804, the second indicium 806, and the third indicium 808 may be associated with different pitching distances between the base 102 and the plate 104. For example, the first indicium 804 may be associated with a first pitching distance (e.g., little league), the second indicium 806 may be associated with a second pitching distance (e.g., Pony), and the third indicium 808 may be associated with a third pitching distance (e.g., college, Major League Baseball, etc.).

The first indicium 804, the second indicium 806, and the third indicium 808 serve to provide visual indications of when the base 102 and the plate 104 are spaced apart by a desired pitching distance. For example, as the cord 108 unwinds from the spool 106, the first indicium 804, the second indicium 806, and the third indicium 808 become visible. Depending upon the desired pitching distance, when the appropriate indicium is visual (e.g., external to the channel 208), the plate 104 may be placed at the second end 802 of the cord 108. Given the different pitching distances, as the cord 108 is unwound from the spool 106, the first indicium 804 may become visible first, followed by the second indicium 806, and then finally the third indicium 808. Accordingly, the first indicium 804 may be spaced apart from the second end 802 of the cord 108 by a first distance, the second indicium 806 may be spaced apart from the second end 802 of the cord 108 by a second distance that is greater than the first distance, and the third indicium 808 may be spaced apart from the second end 802 of the cord 108 by a third distance that is greater than the second distance. Although described as being spaced apart from the second end 802, the first indicium 804, the second indicium 806, and/or the third indicium 808 may be spaced apart from the first end 800 for setting the appropriate pitching distances.

The first indicium 804, the second indicium 806, and the third indicium 808 may respectively span a certain length of the cord 108 (e.g., ½ inch, 1 inch, etc.). In an embodiment, each of the first indicium 804, the second indicium 806, and the third indicium 808 includes a leading edge (e.g., closer to the second end 802) that first becomes visible as the cord 108 is unwound, and a trailing edge that becomes visible after the leading edge. In an embodiment, the indicia may be disposed around a circumference of the cord 108, or may be disposed around less than a circumference of the cord 108. In an embodiment, the first indicium 804, the second indicium 806, and the third indicium 808 may represent any suitable indication or marker on the cord 108. In an embodiment, the first indicium 804, the second indicium 806, and the third indicium 808 may include different colors, numbers, lettering, patterns, textures, etc. to indicate the respective pitching distances.

Although the cord 108 is shown including three indicia, the cord 108 may include more than or less than three indicia. Still, in an embodiment, the cord 108 may not include indicia, but may be cut to predetermined lengths depending upon the pitching distance. Further, the location of the first indicium 804, the second indicium 806, and the third indicium 808 may take into consideration a dimension of the base 102 and/or a location of the spool 106 within the base 102. For example, given that the spool 106 may be disposed within the base 102, the actual length of the cord 108 between the leading edge 114 of the base 102 and the front edge 112 of the plate 104 may be less than the pitching distance. As such, the location of the first indicium 804, the second indicium 806, and the third indicium 808 on the cord 108 may take into consideration in the dimension of the base and/or the placement of the spool 106 within the base 102.

Figure 9A:
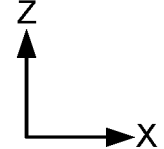
FIGS. 9A-9C illustrate examples of using the cord of FIG. 8 for spacing the portable base and the portable plate at certain distances apart from one another, according to an example of the present disclosure.
Figure 9B:
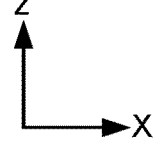
Figure 9C:
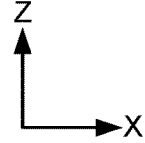

FIGS. 9A-9C illustrate a placement of the base 102 and the plate 104 at different pitching distances, measured from the back point 110 of the base 102 to the front edge 112 of the plate 104. For example, in FIG. 9A, the base 102 and the plate 104 are showing being spaced apart by a first pitching distance 900, in in FIG. 9B, the base 102 and the plate 104 are showing being spaced apart by a second pitching distance 902, and in FIG. 9C, the base 102 and the plate 104 are showing being spaced apart by a third pitching distance 904. The second pitching distance 902 may be greater than the first pitching distance 900, and the third pitching distance 904 may be greater than the second pitching distance 902.

When disposed at the desired pitching distance the indicia on the cord 108 becomes visible. For example, at the first pitching distance 900 the first indicium 804 becomes visible, at the second pitching distance 902 the second indicium 806 becomes visible, and at the third pitching distance 904 the third indicium 808 becomes visible. Moreover, given that the second pitching distance 902 is greater than the first pitching distance 900, and the third pitching distance 904 is greater than the second pitching distance 902, the first indicium 804 is visible at the second pitching distance 902, and the first indicium 804 and the second indicium 806 are visible at the third pitching distance 904.

As noted above, the first pitching distance 900, the second pitching distance 902, and the third pitching distance 904 are measured between the back point 110 of the base 102 and the front edge 112 of the plate 104. As such, the distance interposed between the leading edge 114 of the base 102 and the front edge 112 of the plate 104 may be less than the first pitching distance 900, the second pitching distance 902, and the third pitching distance 904, respectively. To account for the placement of the spool 106 within the base 102, such as a distance between the spool 106 and the leading edge 114 of the base 102, the first indicium 804, the second indicium 806, and the third indicium 808 may be at appropriate locations on the cord 108.

Figure 10:
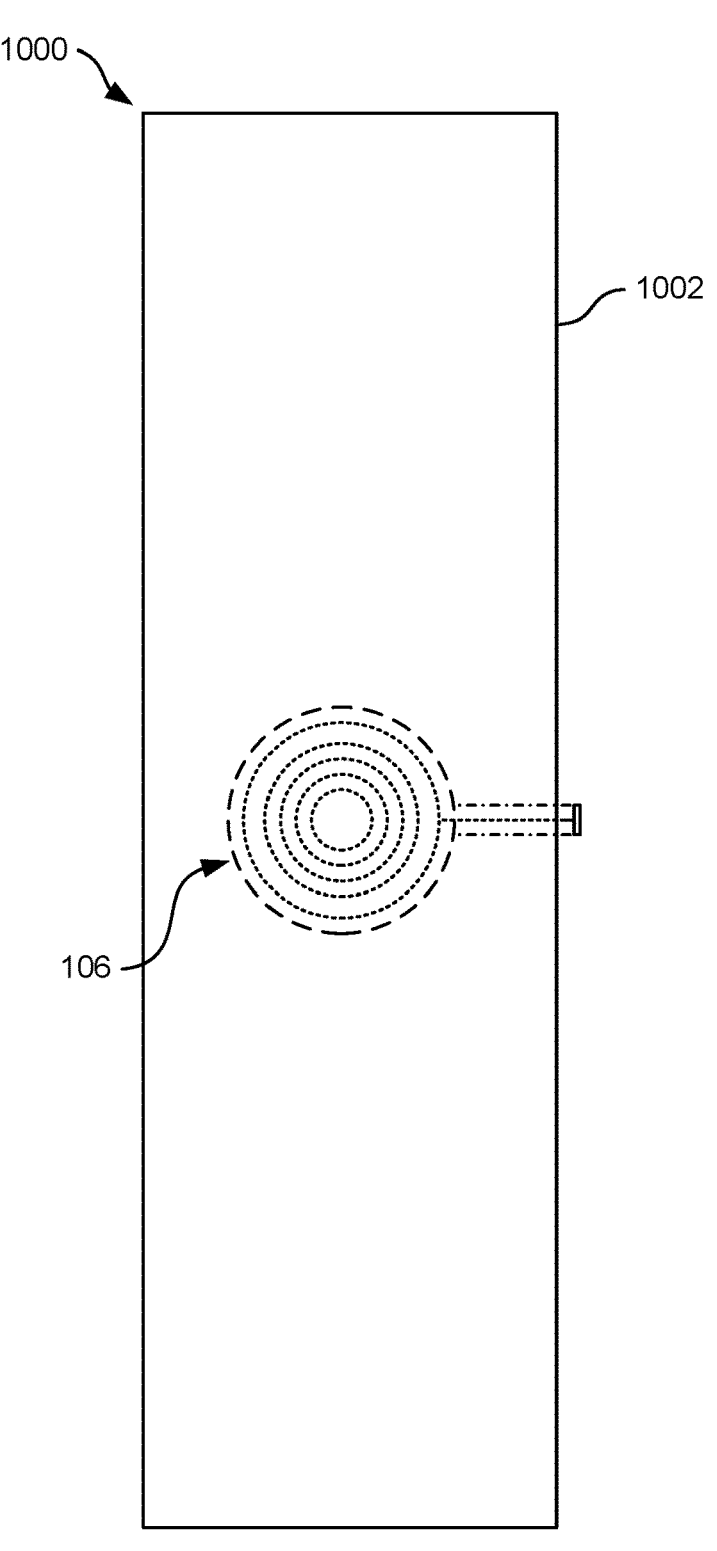
FIG. 10 illustrates an alternative example of a portable plate, according to an example of the present disclosure.
Figure 10:
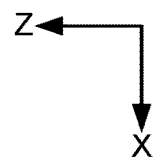

FIG. 10 illustrates an alternate plate 1000 that may be usable with the system 100. For example, instead of the spool 106 being received or disposed within the base 102, the spool 106 may be received or disposed within the plate 1000. In such instances, the plate 1000 may include similar components and features of the base 102 for receiving the spool 106 and permitting the spool 106 to unwind and wind the cord 108. In an embodiment, for example, the cord 108 may exit the plate 1000 along a front edge 1002 that faces the base 102. In examples in which the spool 106 is disposed within the plate 1000, a base may include a receptacle for receiving the cord 108, and may not include the cavity in which the spool is disposed.

Figure 11A:
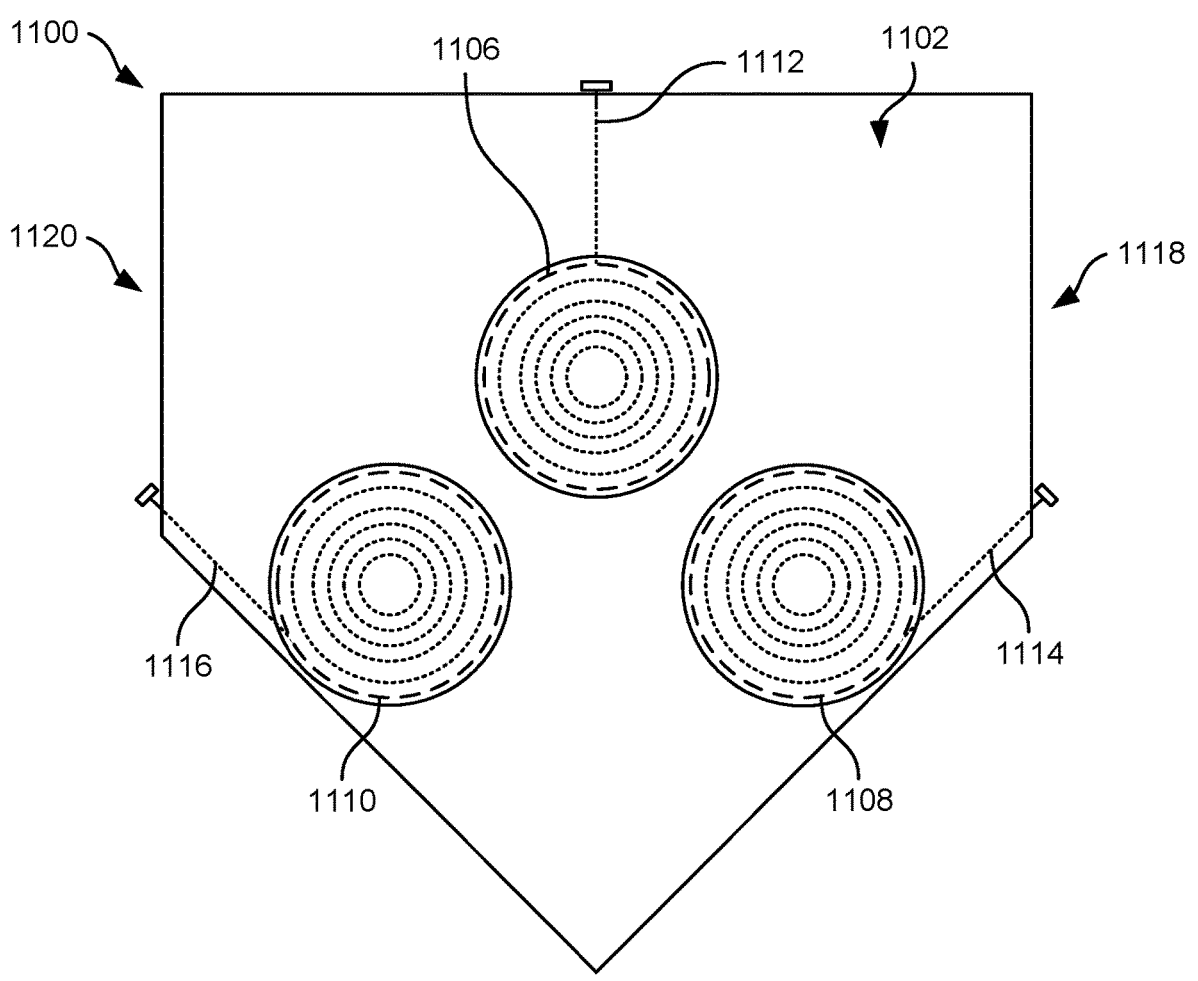
FIGS. 11A and 11B illustrate an alternative example of a portable base, according to an example of the present disclosure.
Figure 11A:
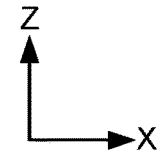
Figure 11B:
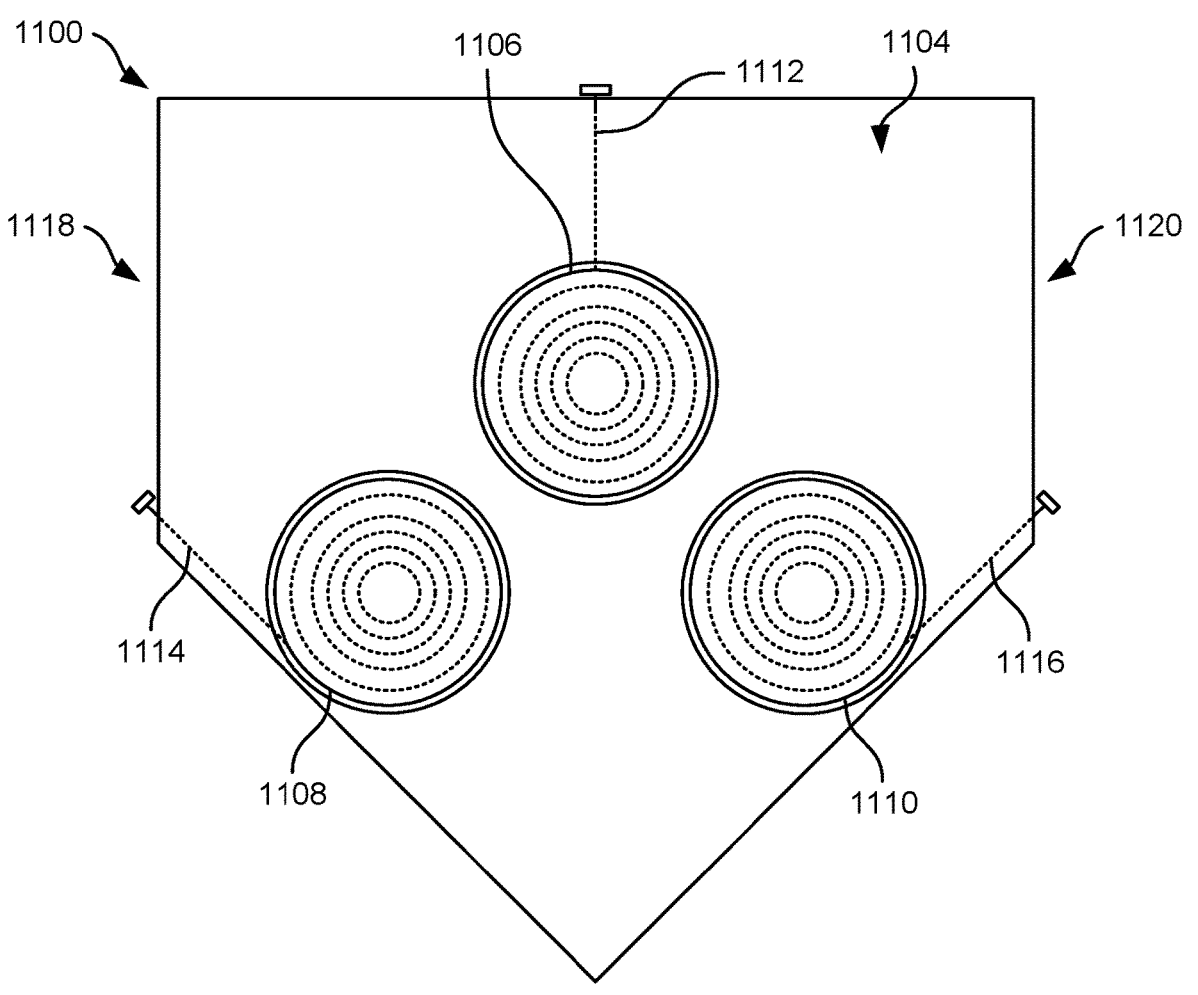
Figure 11B:
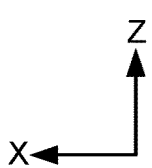

FIGS. 11A and 11B illustrate an alternate base 1100 that may be usable with the system 100. FIG. 11A may illustrate a first side view of the base 1100, such as a top 1102, while FIG. 11B may illustrate a second side view of the base 1100, such as a bottom 1104.

The base 1100 may include a first spool 1106, a second spool 1108, and a third spool 1110. A first cord 1112 may be wound about the first spool 1106, a second cord 1114 may be wound above the second spool 1108, and a third cord 1116 may be wound about the third spool 1110. Additionally, in an embodiment, each of the first spool 1106 and the first cord 1112, the second spool 1108 and the second cord 1114, and the third spool 1110 and the third cord 1116 may function similar to the spool 106 and the cord 108 as described above, respectively, for example. Moreover, the base 1100 may include respective cavities for receiving the first spool 1106, the second spool 1108, and the third spool 1110, as well as channels for routing the first cord 1112, the second cord 1114, and the third cord 1116 from the within the base 1100 to a location external to the base 1100.

In an embodiment, the first spool 1106 and the first cord 1112 may be associated with setting the pitching distance between the base 1100 and a plate, such as the plate 104. The second spool 1108 and the second cord 1114 may be associated with setting a distance between the base 1100 and, for example, first base (not shown). The third spool 1110 and the third cord 1116 may be associated with setting a distance between the base 1100 and, for example, third base (not shown).

Similar to the cord 108 as described above, the first cord 1112, the second cord 1114, and the third cord 1116 may include indicia for setting appropriate pitching distance and running distance. For example, the distance between the base 1100 and first base/third base may be sixty feet (60'), seventy feet (70'), or ninety feet (90'). Here, the indicia on the second cord 1114 and the third cord 1116, for example, may indicate when first base and third base are spaced apart by the desired distance. In an embodiment, the second cord 1114 may be disposed external to a first side 1118 of the base 1100 (e.g., that faces first base), while the third cord 1116 may be disposed external to a second side 1120 of the base 1100 (e.g., that faces third base).

In an embodiment where the system 100 includes the base 1100, the system 100 may include bases (e.g., first base, third base, etc.) that are spaced apart from the base 1100 using the second cord 1114 and the third cord 1116. The bases may be square shaped to correspond to a shape of first base, for example.

Figure 12:
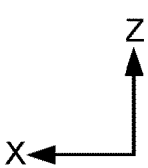
FIG. 12 illustrates an alternative example of a portable base, according to an example of the present disclosure.

FIG. 12 illustrates an alternate base 1200 that may be usable with the system 100. In an embodiment, the base 1200 may be similar to the base 102, for example, and include the cavity 204 and the channel 208. In FIG. 12, however, a spool 1202 may include a handle 1204 that is rotatable to unwind a cord 1206 wrapped about the spool 1202 or wind the cord 1206 about the spool 1202. In an embodiment, the spool 1202 may freewheel as the cord 1206 is unwound, or the handle 1204 may be rotated to let out a given length of the cord 1206 corresponding to a desired pitching distance. The cord 1206 may be similar to the cord 108. In an embodiment, an end of the handle 1204 may include a lever, arm, or peg that is disposed within a receptacle 1208. The engagement between the peg and the receptacle 1208 may lock the handle 1204 in place, or prevent the handle 1204 freewheeling, and accordingly, prevent the cord 1206 being unwound from or wound about the spool 1202.

Figure 13:
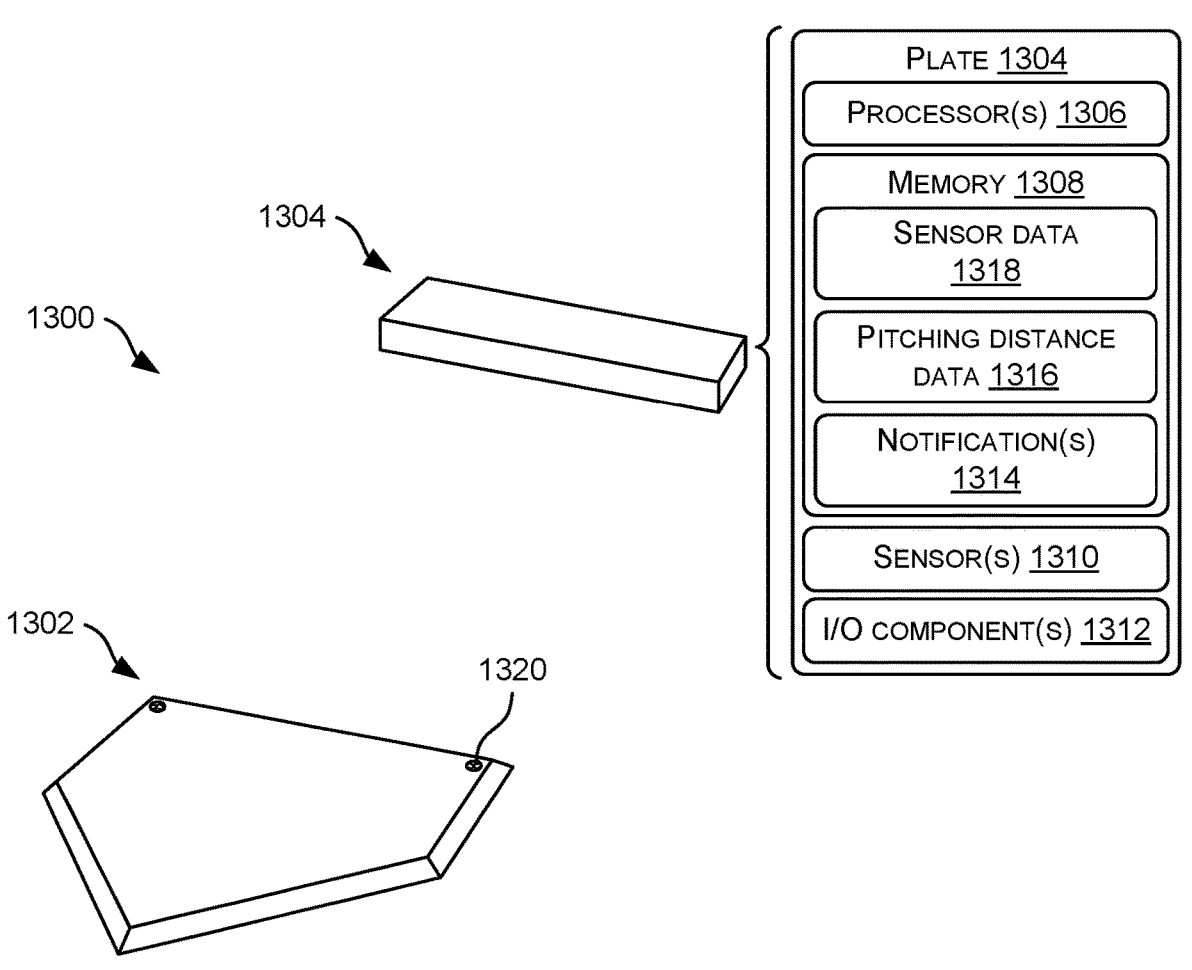
FIG. 13 illustrates an alternative example of a system including a portable base and a portable plate, according to an example of the present disclosure.

FIG. 13 illustrates an alternative system 1300 that includes a base 1302 and a plate 1304 configured to be spaced apart by appropriate distances. The plate 1304 is shown including processor(s) 1306 and memory 1308, where the processor(s) 1306 may perform various functions and operations associated with spacing the base 1302 and the plate 1304 apart by appropriate distances (e.g., pitching distances), and the memory 1308 may store instructions executable by the processor(s) 1306 to perform the operations described herein.

The plate 1304 is shown including sensor(s) 1310 and input/output (I/O) components 1312 for spacing the base 1302 and the plate 1304 apart from one another. For example, the sensor(s) 1310 may be used measure or otherwise determine a distance disposed between the base 1302 and the plate 1304. Examples of the sensor(s) 1310, by way of example and not limitation, may include LiDAR sensor(s), RADAR sensor(s), Sonar sensor(s) (i.e., ultrasonic sensor(s)), imaging sensor(s), infrared (IR) sensor(s), etc. In an embodiment, the sensor(s) 1310 determine a distance between a front edge of the plate 1304 and a leading edge of the base 1302. However, the sensor(s) 1310 may determine distances between the plate 1304 and other portions of the base 1302 (e.g., back point). Regardless, the sensor(s) 1310 may be used to accurately place the base 1302 and the plate 1304 apart by appropriate distances.

In an embodiment, the I/O component(s) 1312 are used to set the pitching distance. For example, the I/O component(s) 1312 may include, button(s), a touch screen, dials, etc. used to programmatically set the pitching distance, as well as speaker(s), lighting element(s), display screen, etc. that output notification(s) 1314. For example, the button(s) may be used to set a pitching distance of ninety feet (90'). This setting may be stored as pitching distance data 1316 within the memory 1308. As the plate 1304 is spaced apart from the base 1302, vice versa, the sensor(s) 1310 may generate sensor data 1318 and the sensor data 1318 may be compared to the pitching distance data 1316. Such comparison may indicate whether the base 1302 and the plate 1304 are spaced apart by the desired pitching distance. If not, the lighting elements may output the notification(s) 1314 (e.g., red light), the speaker may output the notification(s) 1314 (e.g., error sound), the display screen may output the notification(s) 1314 (e.g., "X" mark), and so forth. As the base 1302 and the plate 1304 are further spaced apart, if the base 1302 and the plate 1304 are spaced apart by the desired pitching distance, the lighting elements may output the notification(s) 1314 (e.g., green light), the speaker may output the notification(s) 1314 (e.g., complete sound), the display screen may output the notification(s) 1314 (e.g., check mark), and so forth. In an embodiment, the sensor(s) 1310 are arranged to image marker(s) 1320 (e.g., fiducials) disposed on the base 1302. Still, in some instances, the plate 1304 may communicatively connect (e.g., Bluetooth) for a device of the user (e.g., mobile phone) for outputting indication(s) and/or when the base 1302 and the plate 1304 are appropriately spaced apart.

Although the plate 1304 is described as including components for determining the distance to the base 1302, in an embodiment, the components may be included within the base 1302.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

As used herein, a processor, such as the processor(s) 1306, may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 1308, may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information, and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information, and which can be accessed by the processor(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application

The invention claimed is:

1. A system comprising:
    a base including:
        a cavity, and
        a channel connected to the cavity;
    a plate including an attachment receptacle;
    a spool disposed within the cavity of the base; and
    a cord including:
        a first end coupled to the spool,
        a second end at least partially disposed with the channel and exterior to the channel, the second end including an attachment mechanism configured to engage with the attachment receptacle of the plate,
        a first indicium spaced apart from the second end by a first distance associated with a first pitching distance between the base and the plate, and a second indicium spaced apart from the second end by a second distance associated with a second pitching distance between the base and the plate.

2. The system of claim 1, wherein the second end includes a handle.

3. The system of claim 1, wherein the attachment mechanism is configured to be removably coupled to the attachment receptacle.

4. The system of claim 1, wherein the cord further includes a third indicium spaced apart from the second end by a third distance associated with a third pitching distance between the base and the plate.

5. The system of claim 1, wherein:
the first indicium is associated with at least one of:
  a first color,
  one or more first numbers,
  one or more first letters, or
  a first marker; and
the second indicium is associated with at least one of:
  a second color that is different than the first color,
  one or more second numbers that are different than the one or more first numbers,
  one or more second letters that are different than the one or more first letters, or
  a second marker that is different than the first marker.

6. The system of claim 1, further comprising at least one of:
  a spool handle coupled to the spool; or
  a coil spring engaged with the spool.

7. A system comprising:
a rectangular shaped body including a first attachment mechanism;
an irregular pentagon shaped body; and
a spool including a cord having:
  a first end coupled to the spool,
  a second end configured to unwind at least partially from the spool, the second end including a second attachment mechanism configured to couple to the first attachment mechanism, and
  an indicium marked at a position along a length of the cord associated with a pitching distance disposed between the rectangular shaped body and the irregular pentagon shaped body.

8. The system of claim 7, wherein the spool is rotatably coupled to the rectangular shaped body or the irregular pentagon shaped body.

9. The system of claim 8, wherein the rectangular shaped body or the irregular pentagon shaped body includes a cavity within which the spool is at least partially disposed.

10. The system of claim 7, further comprising at least one of:
  a second indicium marked at a second position along the length of the cord associated with a second pitching distance disposed between the rectangular shaped body and the irregular pentagon shaped body; or
  a third indicium marked at a third position along the length of the cord associated with a third pitching distance disposed between the rectangular shaped body and the irregular pentagon shaped body.

11. The system of claim 10, wherein the indicium is different than at least one of the second indicium or the third indicium.

12. The system of claim 7, further comprising:
a square shaped body; and
a second spool including a second cord having a second indicium marked at a second position along a length of the second cord associated with distance disposed between the square shaped body and the irregular pentagon shaped body.

13. The system of claim 7, further comprising at least one of a spring or handle configured wind the cord onto the spool.

14. A device comprising:
a plate including a first attachment mechanism;
a base; and
a spool configured to rotatably couple to one of the plate or the base, the spool including:
  a second attachment mechanism configured to couple to the first attachment mechanism, and
  a cord having:
    a first indicium located at a first position on the cord, the first indicium being associated with a first pitching distance between the plate and the base, and
    a second indicium located at a second position on the cord, the second indicium being associated with a second pitching distance between the plate and the base, the second indicium being different than the first indicium.

15. The device of claim 14, wherein:
at the first pitching distance, the first indicium is visible and the second indicium is not visible; and
at the second pitching distance, the first indicium and the second indicium are visible.

16. The device of claim 14, wherein:
the one of the plate or the base includes:
  a cavity within which the spool is disposed, and
  a channel disposed between the cavity and an edge of the one of plate or the base; and
the cord is disposed at least partially within the channel.

17. The device of claim 14, further comprising a third indicium located at a third position on the cord, the third indicium being associated with a third pitching distance between the plate and the base, the third indicium being different than the second indicium and the first indicium.

18. The device of claim 14, wherein:
the first indicium includes at least one of:
  a first color,
  one or more first numbers,
  one or more first letters, or
  a first marker; and
the second indicium includes at least one of:
  a second color that is different than the first color,
  one or more second numbers that are different than the one or more first numbers,
  one or more second letters that are different than the one or more first letters, or
  a second marker that is different than the first marker.

19. The system of claim 7, wherein the first attachment mechanism is a loop and the second attachment mechanism is a hook configured to engage with the loop.

20. The device of claim 14, wherein the first attachment mechanism is a first magnet and the second attachment mechanism is a second magnet configured to engage with the first magnet.

\* \* \* \* \*